J. WILLIAMSON.
PNEUMATIC SUSPENSION DEVICE FOR VEHICLES.
APPLICATION FILED MAR. 26, 1912.
1,083,969.
Patented Jan. 13, 1914.
2 SHEETS—SHEET 1.
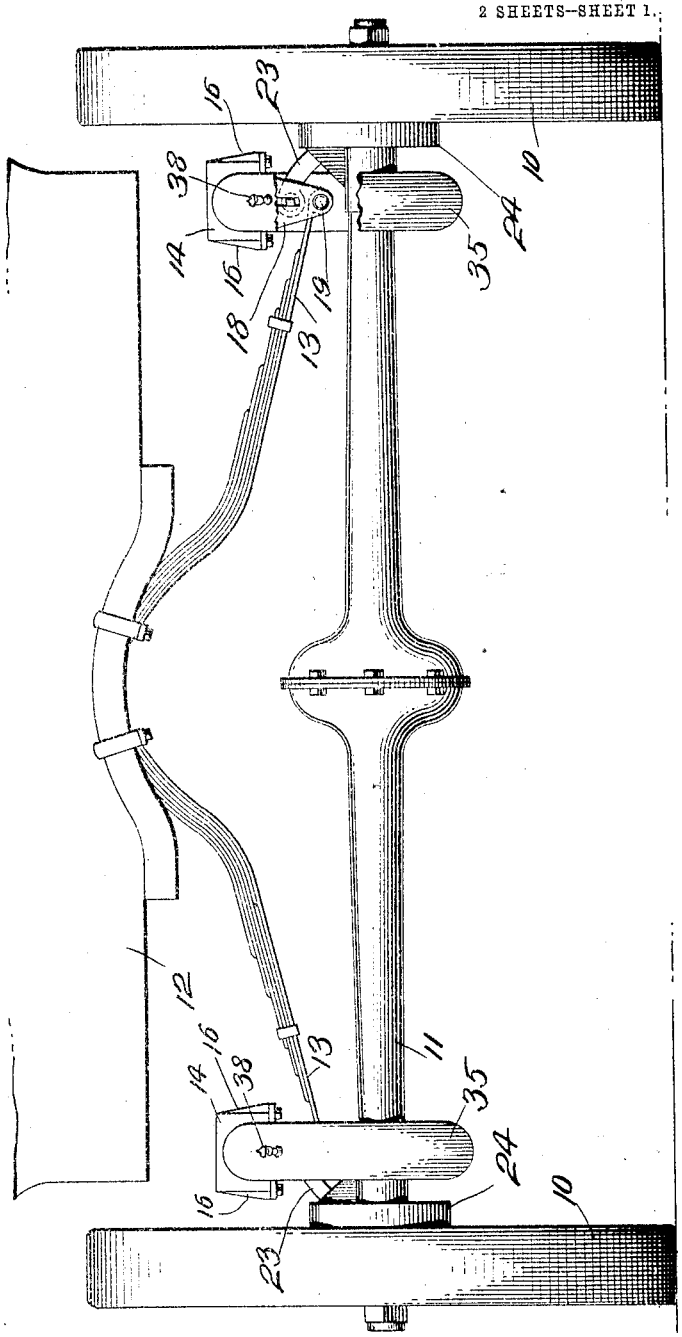

J. WILLIAMSON.
PNEUMATIC SUSPENSION DEVICE FOR VEHICLES.
APPLICATION FILED MAR. 26, 1912.
1,083,969.
Patented Jan. 13, 1914.
2 SHEETS—SHEET 2.
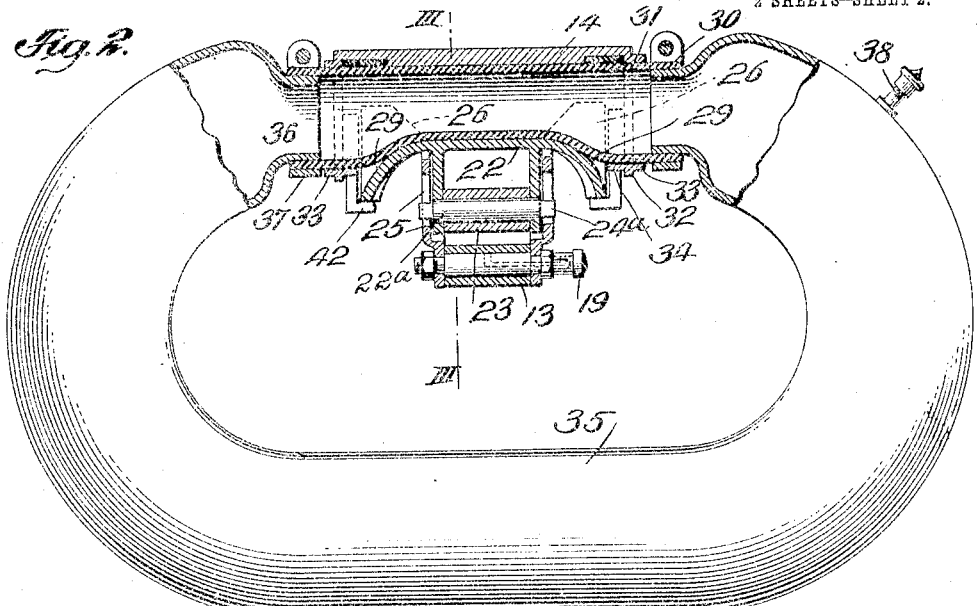
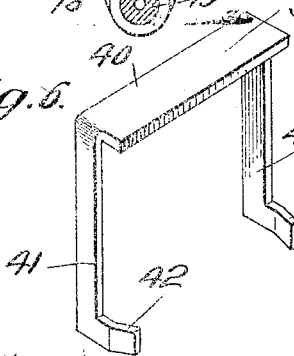
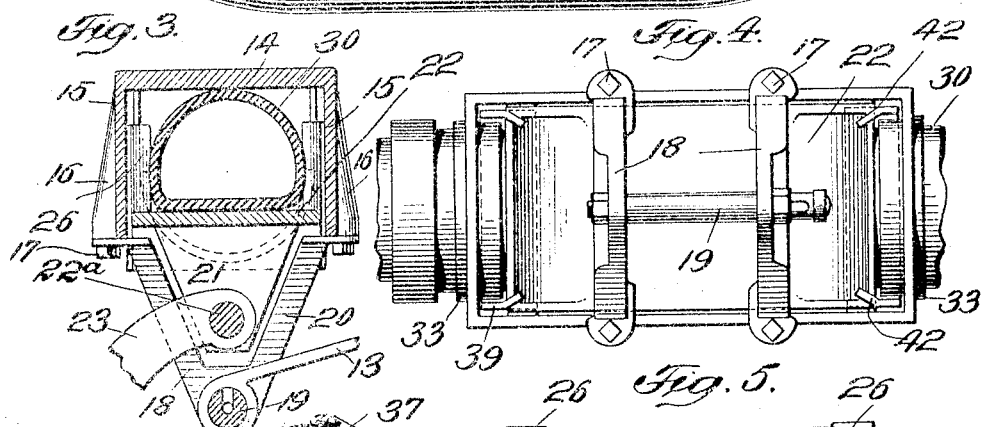
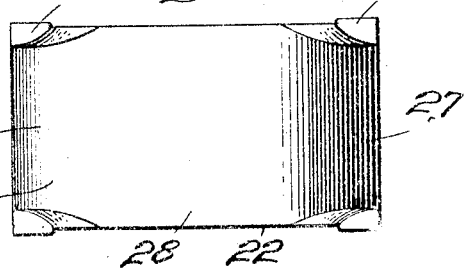
Inventor
J. Williamson
By his Attorneys
Criswell & Criswell

UNITED STATES PATENT OFFICE.

JOHN WILLIAMSON, OF NEW YORK, N. Y., ASSIGNOR OF ONE-HALF TO WARREN Y. HUFF, OF BROOKLYN, NEW YORK.

PNEUMATIC SUSPENSION DEVICE FOR VEHICLES.

1,083,969.  Specification of Letters Patent.  Patented Jan. 13, 1914.

Application filed March 26, 1912. Serial No. 686,319.

*To all whom it may concern:*

Be it known that I, JOHN WILLIAMSON, a citizen of the United States, and a resident of New York, borough of Brooklyn, county of Kings, and State of New York, have invented certain new and useful Improvements in Pneumatic Suspension Devices for Vehicles, of which the following is a full, clear, and exact description.

This invention relates more particularly to means employed as a pneumatic spring for that class of motor vehicles in which the springs extend transversely of the vehicle body instead of lengthwise thereof.

One of the principal objects of the invention is to provide means which may be located between each axle and the vehicle body in such a way that a part or member thereof is movable with the axle and another part or member connected to the spring in order that said parts or members may have relative independent movements and so arranging and constructing the members that they may act upon pneumatic cushioning means located between the same to adapt shocks to be diffused or absorbed as the wheels meet obstructions and at the same time permit wheels with solid tires to be employed instead of the usual form of pneumatic tires.

Another object of the invention is to provide simple and efficient cushioning means which may be conveniently attached to or removed from vehicles as ordinarily constructed without practically any change whatever, and without any substantial change in the relative positions of the parts.

A further object of the invention is to provide means of the character described which is simple in construction and which may be readily made and assembled.

A still further object of the invention is to provide simple and efficient means which may be located and arranged in pairs for each axle, and each device is so constructed that in taking up shocks the pressure within the pneumatic means will remain substantially the same and substantially the same effect secured as in the ordinary pneumatic tire.

With these and other objects in view, the invention will be hereinafter more particularly described with reference to the accompanying drawings, which form a part of this specification, and will then be pointed out in the claims at the end of the description.

In the drawings, Figure 1 is an end view of a motor vehicle showing one form of my invention applied thereto, one of the devices being partly broken away on one side of the vehicle for the purpose of better illustrating the same. Fig. 2 is an enlarged vertical section, partly in elevation, of one of the cushioning devices. Fig. 3 is a vertical section taken on the line III—III of Fig. 2. Fig. 4 is a fragmentary inverted plan. Fig. 5 is a detail plan view of the compression member of the device; and Fig. 6 is a detail perspective view of a member or element for assisting in diffusing or absorbing shocks in a direction wherein the axle moves away from the body of the vehicle.

While I show the invention as applied more particularly to a vehicle in which the springs are arranged transversely of the body and over the axle, it will be understood that the invention may be applied to or modified in such a way as to be applicable to various forms of motor vehicles, and while ordinarily four of such devices are used, two for each axle, a description of one and its operation will answer for the entire equipment of the car or vehicle.

The wheels 10 may be of any suitable form, having solid or other tires, and which may be mounted upon the axle 11 in the usual or in any preferred manner. The vehicle body 12 is located as usual above the axles and extending transversely of the vehicle and at each end thereof is a spring 13 which is interposed between the axle and the vehicle body. These parts may be of any preferred construction.

A box-like casing or member 14 is inverted so as to have its lower portion open, and along the vertical walls 15 thereof and at opposite sides of the center are enlarged portions or bosses 16. The bosses 16 are located opposite each other and secured to the bosses by bolts 17 or otherwise are substantially V-shaped yokes or brackets 18. The brackets 18 form parts of the casing member 14 and are spaced apart, and in their lower ends is held a bolt 19 to which one end of one of the springs 13 is held, the said bolt being provided with means for lubricating the ends of the spring or otherwise constructed, as desired. The brackets 18 are offset to provide recesses 20 in which the projecting and substantially V-shaped parts 21 of a main compression member 22 are adapted to move vertically. This compression member 22 has two parts 21 adapted to be guided in the brackets 18 and said parts 21 are connected together by a bolt 22ª. The bolt 22ª is held to an arm or lug 23 which projects outward from each enlarged part 24 of the vehicle axle 11. It will be apparent that in case of a relative movement between the vehicle body and the axle that the compression member 22, owing to its connection with the lug or arm 23 and the connection of the ends of the spring 13 with the bolts 19 will cause a likewise relative movement of the members 22 and 14, the former being properly guided and adapted to move within said member 14, it being further apparent that the bolt 22ª serves substantially as a pivoting means for the device in order that the said device may swing slightly or otherwise due to the lengthening and shortening of the spring during the up and down movement of the vehicle body.

The bolt 22ª may have its ends reduced, as at 24ª, Fig. 2, and guided in vertical slots 25 in the yokes or brackets 18, serving further to guide the compression member 22 in its movements relatively to the casing member 14. This member 22 is substantially rectangular in plan and is provided with upright bearing portions 26 at its corners. These bearing portions may be flush with the sides of said member or may extend slightly beyond the same in order that said surfaces may be readily planed or milled to provide a proper sliding connection between the members 14 and 22, the latter being also provided with bearing surfaces for the parts 26. The member 22 has a plate-like base or part 27 providing a relatively large flat bearing surface 28 and downwardly curved end portions 29. A cushioning element or means, as a rubber tube 30, is interposed between the member 14 and the member 22 and said tube has its ends passing through openings 31 in the end walls 32 of the member 14 so as to be properly supported thereby, the said end walls being provided with bosses 33 on the outer surface thereof and semi-circular bosses 34 on the inner surface thereof to assist in holding and supporting said tube. By providing the plate-like bearing portion 27 on the compression member and having the ends 29 curved any movement to compress the tube or cushioning means 30 will increase the extent of bearing of said member against the tube and consequently increase the resistance due to such increased bearing.

It is desirable that the pressure within the tube be increased as little as possible while absorbing or diffusing shocks and to obtain the result secured by the usual pneumatic tire. To accomplish this and to utilize as little rubber as possible and at the same time give an extent of compression surface sufficient to properly absorb the shocks, I arrange a reservoir 35 and connect the same to the ends of the cushioning means or tube 30. The reservoir or member 35 may be somewhat larger in diameter than the diameter of the tube 30 and in this case may have its ends reduced, as at 36, to fit within the tube 30. The reservoir 35 may be of metal and may be arranged parallel with the axle or may be arranged to encircle the axle in the manner shown and the ends of said reservoir may be made to fit neatly within the ends of the tube 30 or held to the tube in any suitable way. As one means, a clip or clamping band 37 may be provided which when fastened about the ends of the tube will rigidly hold the same to the ends of the reservoir 35. This reservoir may be provided with a valve 38 by which air may be forced within said reservoir and into the compression tube 30 at any desired pressure. The reservoir 30 forms a substantially continuous and unrestricted connection with the compression tube so that the air from the compression tube may be forced into the reservoir and as quickly returned in order to quickly compensate for the movement of the member 22, and by having the reservoir serve as a relatively large container for the air, the latter may be forced from the part of the tube 30 that is being compressed by the member 22 into the reservoir without materially increasing the pressure and thus absorbing or taking up shocks in a manner quite similar to that secured by the ordinary pneumatic tire.

The construction and operation of the device thus far described will be readily understood from the foregoing description when taken in connection with the accompanying drawings. It will be evident that as the vehicle moves along the roadway and in case the wheels should meet an obstruction, any movement of the wheels and axle will be conveyed through the arm or lugs to the member 22 and this member 22 will move vertically within the box-like member 14 and compress the tube 30. As the tube is compressed the air will be forced to either or both sides into the reservoir 35 and on the recoil the air will again inflate the tube 30. The member 22 by reason of its construction will during the compression movement have its bearing surface against the tube increased thus increasing the resistance and serving better to take up or compensate for unusual shocks. The box-like member 14 is held yieldingly against movement by the spring 13 and by reason of the connection with the spring the devices may tilt or move with the bolt 22ª as a pivot to allow for the lengthening or shortening of the spring during the up and down movement of the vehicle body.

To absorb or diffuse shocks in a direction opposite to the movement of the compression member 22 various means may be employed. As shown, I provide a device or element 39 on the inside of the member 14 and adjacent to each of the end walls 32 of the member 14. These elements 39 each have a plate-like portion 40 adapted to extend transversely of the tube 30 above the semi-circular boss portion 34 of the member 14, and extending downward from the plate-like part 40 are the arms or parts 41 which are adapted to span the tube 30. These arms have fingers 42 projecting outward and angular therewith which are adapted to engage under the lower end of the curved parts 29 of the compression member 22. In this way any tendency of the axle to move away from the vehicle body in a direction opposite to the movement of the member 22 will cause the elements 39 to be carried by said member 22, thereby compressing the pneumatic tube 30 at the upper portion thereof.

It will be manifest from the foregoing that a simple and efficient device is provided which is particularly adapted for vehicles in which the springs extend transversely of the vehicle instead of lengthwise thereof; that said device provides effective means for absorbing or diffusing the shocks; that said means may be applied to the vehicle with substantially no change whatever and without materially altering the relative position of the parts; and that said device is simple in construction and may be readily made and assembled.

Having thus described my invention, I claim as new and desire to secure by Letters Patent:—

1. The combination of a vehicle body, an axle, wheels mounted on said axle, a lug projecting from the axle, a spring, a device having two parts movable one within the other, one part being held to one of the lugs and the other part of each device held to one end of the spring, each device being supported to swing transversely of the vehicle, compressible cushioning means located between the members, and a reservoir connected to said cushioning means and extending around the axle.

2. The combination of a box-like member having parts thereof adapted for attachment to a spring, a compression member movable within the box-like member and having a plate-like compression portion with curved ends adapted to vary the extent of bearing surface during its compression movement, means for guiding the members relatively with respect to each other, a compression tube supported in the box-like member, and a substantially C-shaped metallic reservoir having an unrestricted connection with both ends of the tube.

3. The combination of a casing member adapted for attachment to a spring, a compression member movable within the casing member and having a bearing adapted to vary the extent of bearing surface during its compression movement, means for guiding the members relatively with respect to each other, a short pneumatic tube supported in the casing member, and a reservoir connected at both of its ends with the ends of the tube.

4. The combination of a casing member having parts thereof adapted for attachment to a spring, a compression member movable within the casing member, means for guiding the members relatively with respect to each other, a pneumatic tube supported in the casing member, and a metallic reservoir of a relatively larger diameter than the tube and extending from one end of said tube to the other end thereof thereby forming an unrestricted connection between the two outer ends of the tube.

5. In a device of the character described, the combination of a box-like member having spaced substantially V-shaped yokes, said yokes being provided with an offset part and vertical slots therein, a compression member having substantially V-shaped parts held to move in the offset parts of the yokes, a bolt adapted for connection with the vehicle axle and having its ends reduced and guided in the slots, said bolt forming a pivot for the device to adapt the same to swing, a bolt connecting the V-shaped parts of the first-mentioned member and serving as means for connection with the end of a spring, and a pneumatic tube arranged between the members, said compression member being substantially rectangular and having bearing portions at the ends thereof and with a plate-like compression portion having curved ends and adapted to compress the tube.

6. In a device of the character described, the combination of a casing member having parts projecting from the body thereof, said parts being provided with vertical slots therein, a compression member having parts held to move in the projecting parts of the casing member, a bolt adapted for connection with the vehicle axle and having its ends reduced and guided in the slots, said bolt forming a pivot for the device to adapt the same to swing, a bolt located in the projecting parts of the casing member and serving as means for connection with the end of a spring, and a tube located between the members, said compression member having bearing portions at the ends thereof and with a plate-like compression portion having curved ends and adapted to compress the tube.

7. In a device of the character described, the combination of a casing member, a substantially rectangular compression member movable in the casing member and having its body constructed to vary the extent of its bearing surface during the compression movement, a pneumatic tube adapted to be compressed by said compression member and a metallic reservoir extending from one end of said tube to the other end thereof, thereby forming an unrestricted connection between the two outer ends of the tube.

8. In a device of the character described, the combination of a box-like member, a compression member having a bearing with and movable within said casing member, a bolt held to the compression member and forming a pivot for the device to adapt the same to swing, a bolt held to the casing member serving as means for connection with the end of a spring, a tube interposed between said members and a reservoir connected to both ends of the tube and forming a continuation thereof, said compression member being substantially rectangular and having bearing portions at the ends thereof and with a plate-like compression portion having curved ends and adapted to compress the tube.

9. In a device of the character described, the combination of a box-like member having means for attachment to a spring, a compression member movable within the box-like member and having means to adapt the same to move with the vehicle axle, a pneumatic tube, a reservoir connected to said tube at each end and forming substantially a continuation thereof with an unrestricted passage therefrom, and two elements having a plate-like portion and arms provided with means to engage the ends of the compression member and adapted to partake of the downward movement of the compression member to compress the tube at the upper portion thereof.

10. In a device of the character described, the combination of a casing member having means for attachment to a spring, a compression member movable within the casing member and adapted to move with the vehicle axle, a pneumatic tube, a reservoir connected to said tube, and two elements having a plate-like portion and arms provided with fingers to engage the ends of the compression member and adapted to partake of the downward movement of the compression member to compress the tube at the upper portion thereof.

This specification signed and witnessed this 23rd day of March A. D. 1912.

JOHN WILLIAMSON.

Witnesses:
C. BARTELS,
ERNEST D. CONDIT.